United States Patent [19]
Scott

[11] 3,828,626
[45] Aug. 13, 1974

[54] HAND OPERATED VARIABLE SPEED REDUCERS

[75] Inventor: Modesto Ochoa Scott, Mexico City, Mexico

[73] Assignee: Humberto Viadas Enriquez, Calle, Mexico

[22] Filed: Dec. 17, 1971

[21] Appl. No.: 209,306

[30] Foreign Application Priority Data
Dec. 18, 1970 Mexico .............................. 124231

[52] U.S. Cl. ............... 74/689, 74/230.18, 74/230.2, 74/230.21, 74/710
[51] Int. Cl. .......................... F16h 37/00, F16h 1/38
[58] Field of Search ......... 74/230.18, 230.2, 230.21, 74/689, 710, 244

[56] References Cited
UNITED STATES PATENTS

| | | | |
|---|---|---|---|
| 334,377 | 1/1886 | Herman ............................ | 74/230.2 |
| 581,286 | 4/1897 | Heywood ............................ | 74/689 |
| 630,087 | 8/1899 | Nasmith ............................ | 74/689 |
| 846,086 | 3/1907 | Bouvier et al. ...................... | 74/689 |
| 944,585 | 12/1909 | Watson ............................ | 74/230.2 X |
| 1,374,439 | 4/1921 | Doherty ........................... | 74/230.21 |
| 1,446,294 | 2/1923 | Healey ............................. | 74/244 |
| 1,650,449 | 11/1927 | Jaeger ............................. | 74/230.2 X |
| 2,027,710 | 1/1936 | Stewart ............................ | 74/689 |
| 2,049,065 | 7/1936 | Kahn ............................... | 74/244 |
| 2,180,202 | 11/1939 | Hallden ............................ | 74/689 X |
| 2,344,341 | 3/1944 | Coen ............................... | 74/230.21 |
| 2,716,358 | 8/1955 | Pool et al. ......................... | 74/710 |
| 3,334,527 | 8/1967 | Carnecie ........................... | 74/689 |
| 3,481,221 | 12/1969 | Gaskins ............................ | 74/689 |

FOREIGN PATENTS OR APPLICATIONS

| | | | |
|---|---|---|---|
| 592,991 | 5/1959 | Italy ................................ | 74/710 |

Primary Examiner—Samuel Scott
Assistant Examiner—Lance W. Chandler
Attorney, Agent, or Firm—Finnegan, Henderson, Farabow & Garrett

[57] ABSTRACT

A hand operated reducer or speed changer for use in connection with transmission gears which comprises motor and driving axles on one single line, lodged in a housing and jointed by a ball-bearing, which allows the axle to rotate in an inverted movement in order to transmit variable speed to a differential gear in relation to the steady speed derived from a driving source.

10 Claims, 10 Drawing Figures

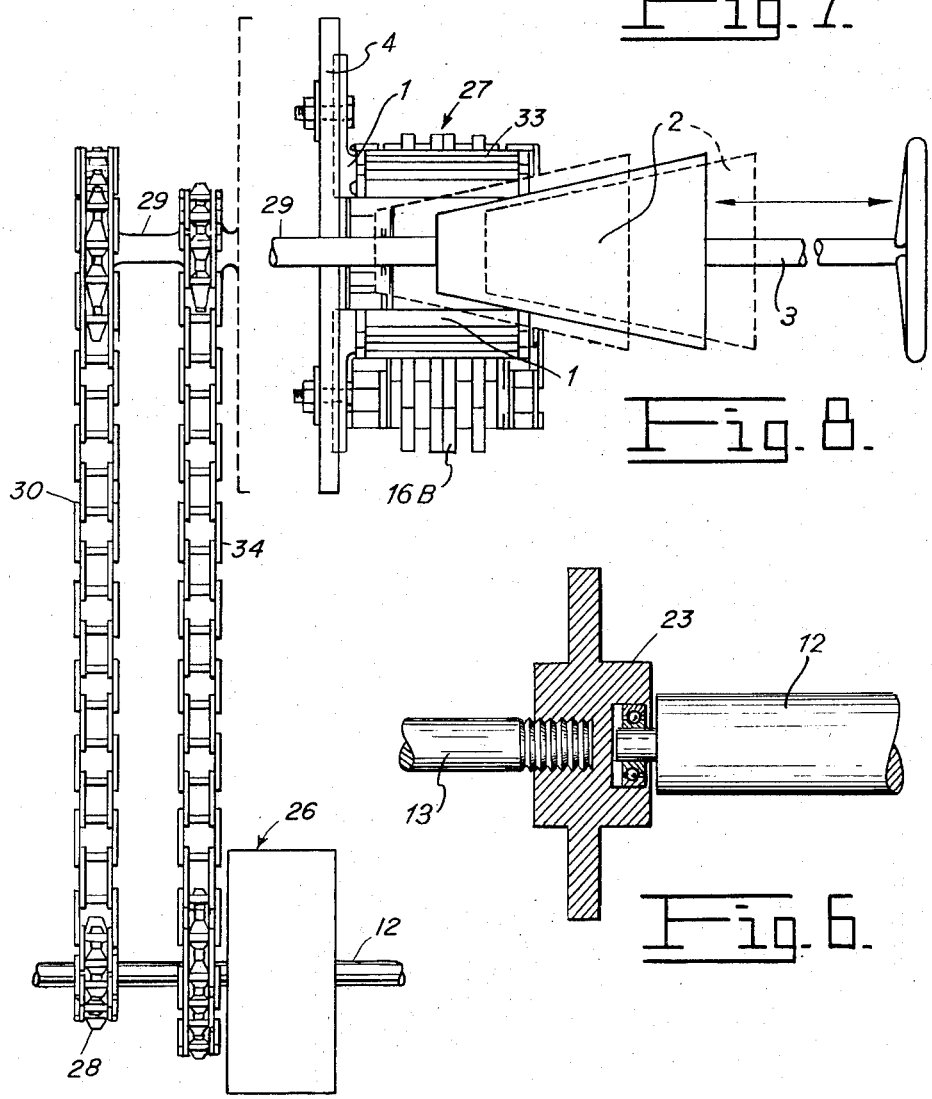

HAND OPERATED VARIABLE SPEED REDUCERS

BACKGROUND OF THE INVENTION

1. Field of the Invention

This invention refers and is related to the field of gear mechanics, and more specifically, to the industry devoted to the manufacture of variable speed gear assemblies intended to modify speed deriving from a driving source to obtain variable speeds as desired.

2. Description of the Prior Art

To date, a number of conventional type speed reducers and other devices have been used, which consist of a combination of various gear sizes producing variable speed rotations according to gear diameter, all of which can only be used in connection with mechanical devices or machines of a limited horsepower classification.

SUMMARY OF THE INVENTION

It is therefore the main object of the present invention to introduce a speed reducer or changer having a number of hand operated systems which produce a wide range of outlet speeds.

Another object of the present invention is to introduce a simple, lightweight, efficient speed reducer, with high mechanical efficiency, inexpensive and with a low-cost maintenance feature as against the conventional type units which are highly complicated, heavy and expensive.

It is still a further object of the present invention to introduce a speed reducer permanently connected in its overall positions, which feature, to date, had been regarded as mechanically unattainable.

A further object of the present invention is that of introducing a hand operated variable speed reducer with a practical application to all machinery, regardless of its horsepower classification.

These and other objects of this invention will be apparent to all those skilled in the art as a result of an analysis of the following specifications and drawings.

BRIEF DESCRIPTION OF THE DRAWINGS

FIG. 5 illustrates a side view, in a partial cut, showing the exact position of the motor and driving axles and differential system.

FIG. 6 presents a side view in a partial cut showing the position of the axles, as they are jointed by a ball-bearing within the center of the housing.

FIG. 7 presents an illustrated view of the triple central chain.

FIG. 8 presents a side view, in illustrated cuts, showing the overall position of the handwheel, of the cone and corresponding chains.

DESCRIPTION OF THE PREFERRED EMBODIMENTS

Figure 1:
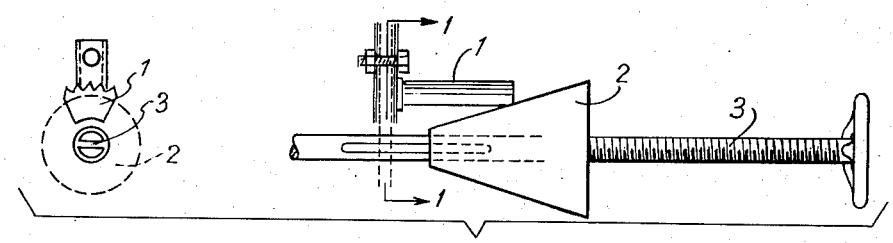
FIG. 1 shows a side view and sectional view taken along line 1—1 of the handle or handwheel which is used for operating the invention and related parts.

Following is a more accurate description of this invention and, more specifically, of the various descriptions contained in the above mentioned FIGURES:

The reducer consists of the following combined number of parts enclosed within a housing 18 : 1, skid guides; 2, cone; 3, hand operated screw operated by means of a handwheel; 4, disk with five radial grooves to accommodate five skid guides, which open and close depending upon the movement of cone 2, which is hand operated by handle 3; 5, crown wheel axle, which is three times the size of gear 6; 6, spool-shaped double gear; 7, gear mounted on the axle of the double gear 6—6; 8, camber; 9, spring; 10 and 11, differential reducing disks; 12, driving axle equipped with a gear twice as large as motor axle 13; 13, motor axle; 14—14 double transmission satellite eccentric gears to compensate chain stretching as a result of axle wear and stretching of the links; satellite differential gears; 16B, central teeth of the triple horizontal chain 16; 16A and 16C, sides of the horizontal chain 16, equipped with a tension member to compensate variable diameter sizes of the five dentated skid guides 1; 17, motor; 18, mechanism gear assembly; 19, oil level gage; and, located right next to it, a plug to drain the burned oil; 20 and 21, gears.

Figure 9:
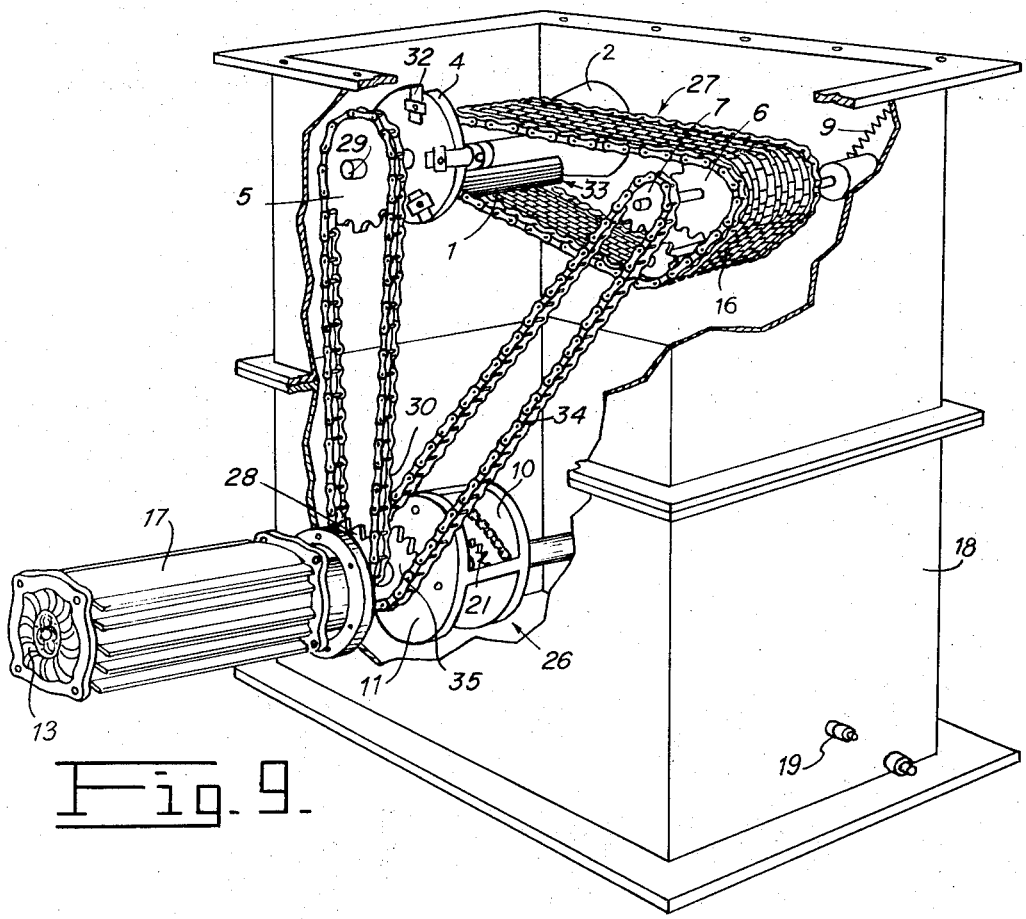
FIG. 9 presents a view in a conventional perspective of the housing lodging the mechanism, and illustrating, by means of a partial cut, the mechanism and the exterior projection of the differential gear.
Figure 10:
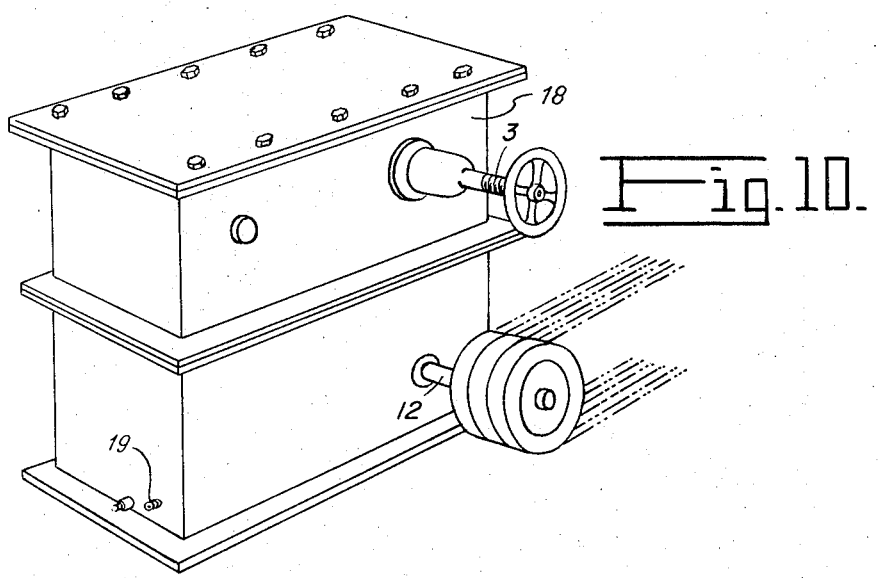
FIG. 10 shows an exterior view in a conventional perspective of the mechanism housing.

The housing 18, of the reducing unit, lodges all the axle supports, duly raced. Motor axle 13 and driving axle 12, FIG. 5, are mounted on one single line and jointed in the center of the housing by a ball-bearing 23, FIG. 6, which allows them to turn in an inverted sense. Disks 10 and 11, FIG. 9, are rotatably mounted on the axles 12 and 13 respectively by means of ball-bearing. Gear 20, is mounted in a fixed position on the motor axle 13; gear 21, is mounted in a fixed position on the driving axle 12.

Figure 2:
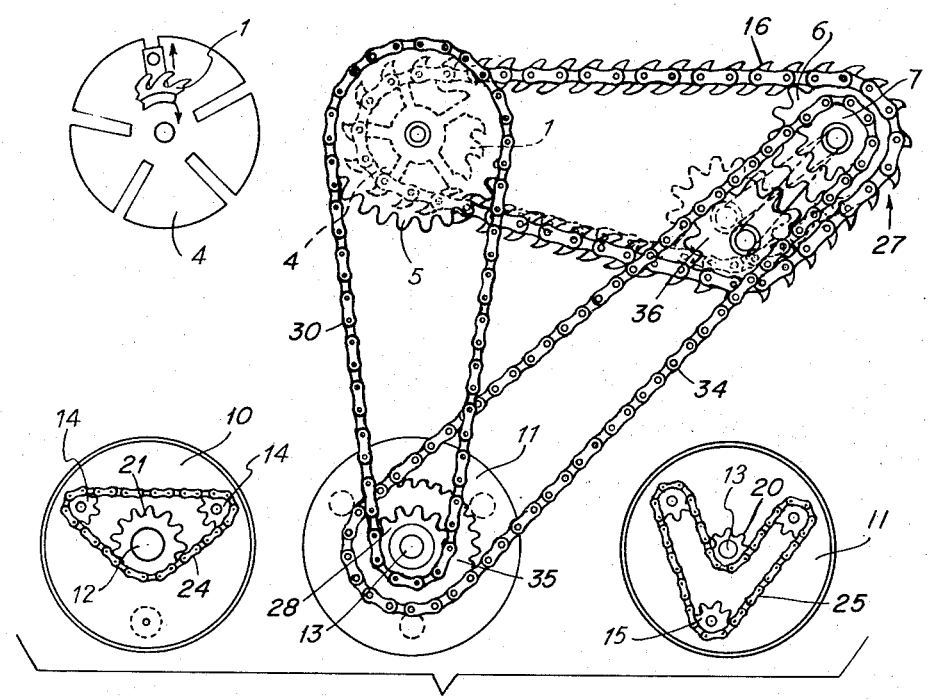
FIG. 2 shows a side view of the operating chains and gears.

Located between disks 10 and 11, FIGS. 2 and 5, are the gears 21, 20 which are mounted on a fixed position on the motor and driving axles 12 and 13; located within the same disks are double gears 14—14 and gear 15, which represent the satellite gears of the differential gear, FIGS. 2 and 5. As can be readily seen from the manner on which the load chains 24, 25 of the differential gear are mounted, as the motor axle turns to the right, the driving axle turns in an inverted sense, as illustrated in FIGS. 2 and 5.

Once it is understood why the motor and driving axles turn in an inverted sense, it will also be clear why the differential gearing 26 constituted by axles 12 and 13, by disks 10 and 11, by the satellite gears, 14—14 and 15, by the gears 21, 20 which are mounted in a fixed position on axles 12 and 13, and by the load chains 24, 25, FIGS. 2 and 5, is mounted freely on its own ball-bearings and has a free rotation which coincides with the motor axle rotation.

Nevertheless, if the differential gearing 26 were to be mounted in a fixed position, the complete rotation of the motor axle 13 would pass to the driving axle 12, depending upon the actual relation existing between the two gears 20, 21 which are mounted in a fixed position on both axles; thereupon moving in an inverted sense as a result of the action of the load chains 24, 25 above mentioned, if, on the other hand, the differential gear were to be left free, FIG. 5, then the rotation of the motor axle 13 will not pass to the driving axle 12 by reason of the fact that the differential gearing 26 can actually rotate.

It is therefore clearly established that by stopping the driving axle 12, the differential gearing 26 rotates, in the same manner than by stopping the differential gearing, the driving axle rotates. Obviously, if the motor axle 13 is permitted to rotate in a complete cycle while the differential gearing is allowed to rotate only one half cycle, such fraction of the cycle will be evidenced in the driving axle; we can therefore conclude that the full cycle rotations taken by the differential axle over the normal rotation of the motor axle, are deducted from the full cycle rotations of the driving axle, whether they be full cycle rotations or fractions thereof.

From the following explanation it will be seen how the reducing unit 27 controls the rotations of the differential axle 12. The motor axle 13 has a gear or sprocket wheel 28 mounted in a fixed position, which is illustrated in FIG. 8, on the left side, which drives the main axle 29 of the variable speed system, upper section of the housing, by means of a chain 30, FIG. 8, top.

This axle 29 is driven by a gear or sprocket wheel 5 mounted on a fixed position on the axle 29. The sprocket wheel 5 is three times larger in diameter than the sprocket wheel 28 on the motor axle 13 from which it receives movement by virtue of a chain 30; disk 4 is mounted on the center of the length of axle 29, which disk has five radial grooves 32, accommodating five sprocketed skid guides 1, which open and close their diameter depending on the operation of a cone 2 which moving on its own axle is driven in and out by means of a hand operated screw 3 from the exterior, FIGS. 1 and 8. This skid guide 1, FIG. 1, is dentated, horizontally, so that the sprockets engage in the center of triple chain 16, having a variable speed depending upon the diameter of the variable diameter, gear 33 formed by the five skid guides 1, which open and close at will with cone's 2 position, which cone is controlled at will externally and hand driven by means of a handwheel and a screw 3.

Figure 3:
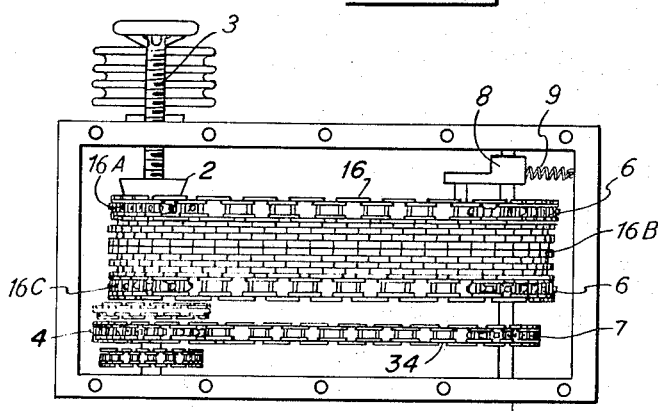
FIG. 3 shows an upper plan view of the housing with its top removed and its integrating mechanisms.

As above explained, triple chain 16, FIG. 3, engages in its central section 16B, with the variable diameter gear, while the two side sections, 16A and 16C, engage with gears or sprocket wheels 6, which are mounted over the camber 8, as illustrated in the same FIG. 3; this camber, logically, has variable revolutions, depending upon the size of the diameter of the variable diameter gear.

Gear or sprocket wheel 7, is also mounted in a fixed position on this same camber, as illustrated in the above mentioned FIG. 3; this gear 7, by means of the chain 34, transmits its motion to the differential gearing 26 by means of the ring sprocket 35 mounted in a fixed position, externally, on disk 11. In this manner, the differential gearing 26 may have variable revolutions depending upon size of diameter of the variable diameter gear 33.

Figure 4:
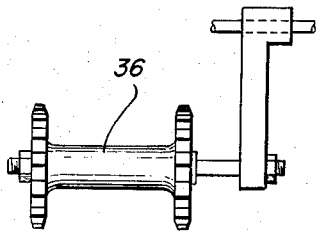
FIG. 4 shows a side view of a spool-shaped double gear mounted over a pendulum arm.

On the bottom side of the triple chain, internally, which is the section that has no tension, a spool-shaped double gear 36, operates, FIG. 4, which gear is mounted on a pendulum arm 37 in order to hold the triple chain 16 in a tensive position by means of the traction of a spring 9, thus compensating the variations of the diameter of the variable diameter gear 33.

All axles are mounted on ball-bearings, including the double satellite gears, 14—14 and 15 of the differential gearing 26, which axles have eccentric shanks to regulate the tension of the load chains.

From the above it can be understood that the entire motor stress is completely supported by the load chains 24, 25 of the differential gearing 26, and not by the reducing system 27.

Those persons skilled in the art will be able to conceive different variations of the inventive principles described, without departing from the essence of the same, since these have been submitted in a stating and not exhaustive manner.

I claim:

1. An improved variable speed transmission system comprising:
   a. a rotatably mounted driving axle;
   b. a driven axle rotatably mounted for movement relative to said driving axle;
   c. a differential system including a driving gear fixedly attached to said driving axle, a driven gear fixedly attached to said driven axle, a first disk mounted on said driving axle for rotatable movement therebetween, at least one first satellite gear rotatably mounted on said first disk and drivingly connected to said driving gear, a second disk connected to said first disk and mounted on said driven axle for rotatable movement therebetween, at least one second satellite gear rotatably mounted on said second disk and drivingly connected to said driven gear, said first satellite gear being drivingly connected to said second satellite gear;
   d. a differential control system including a variable diameter rotary member, control means for selective variation of said variable diameter member, first means drivingly interconnecting said driven axle and said variable diameter member, second means fixedly connected to one of said disks to preclude relative rotation therebetween, said second means being driven directly by said variable diameter member;
   the rotational speed of said driving axle being effected by said driven axle and said differential system and being selectively controlled by variation of said variable diameter member.

2. A transmission system as defined in claim 1 wherein said driving axle and said driven axle are coaxial.

3. A transmission system as defined in claim 1 wherein said variable diameter rotary member includes a third disk having a plurality of radial grooves and sprocket bearing members slidably received in said grooves and wherein said control means includes a tapered member mounted for sliding movement relative to said sprocket bearing members to effect radial movement of said sprocket bearing members in said grooves.

4. A transmission system as defined in claim 1 wherein said first means includes a first sprocket wheel fixedly mounted on said driven axle, a second sprocket wheel drivingly connected with said variable diameter member, and a first chain drivingly connecting said first and second sprocket wheels.

5. A transmission system as defined in claim 4 wherein said second means includes a third sprocket wheel connected to said one of said disks, said system including a fourth sprocket wheel driven by said variable diameter member, and a second chain drivingly connecting said third and fourth sprocket wheels.

6. A transmission system as defined in claim 5 wherein said variable diameter rotary member includes a third disk having a plurality of radial grooves and sprocket bearing members slidably received in said grooves, a fifth sprocket wheel drivingly connected to said fourth sprocket wheel, a third chain drivingly connecting said sprocket bearing members and said fifth sprocket wheel, and wherein said control means includes a tapered member mounted for sliding movement relative to said sprocket bearing members to effect radial movement of said sprocket bearing members in said grooves.

7. A transmission system as defined in claim 6 wherein said tapered member is manually operated.

8. A transmission system as defined in claim 6 including two spaced apart first satellite gears drivingly connected together and to said driving gear by a first load chain, and at least two spaced apart second satellite gears drivingly connected together and to said driven gear by a second load chain.

9. A transmission system as defined in claim 6 wherein said driving gear and said driven gear are of different diameters.

10. A transmission system as defined in claim 1 wherein said driving axle and said driven axle rotate in opposite directions.

* * * * *